(12) United States Patent
Allamaraju et al.

(10) Patent No.: US 7,996,494 B2
(45) Date of Patent: Aug. 9, 2011

(54) SYSTEM AND METHOD FOR DELIVERING GROUPED WEB SERVICE APPLICATIONS

(75) Inventors: Subrahmanyam Allamaraju, Longmont, CO (US); James D'Ambrosia, Westminster, CO (US)

(73) Assignee: Oracle International Corporation, Redwood Shores, CA (US)

(*) Notice: Subject to any disclaimer, the term of this patent is extended or adjusted under 35 U.S.C. 154(b) by 858 days.

(21) Appl. No.: 11/170,053

(22) Filed: Jun. 29, 2005

(65) Prior Publication Data

US 2007/0005726 A1    Jan. 4, 2007

(51) Int. Cl.
 *G06F 15/16* (2006.01)
 *G06F 15/167* (2006.01)

(52) U.S. Cl. .................. 709/218; 709/203; 709/217

(58) Field of Classification Search .................... 709/218
 See application file for complete search history.

(56) References Cited

U.S. PATENT DOCUMENTS

| | | | |
|---|---|---|---|
| 6,507,867 B1* | 1/2003 | Holland et al. | 709/219 |
| 6,564,251 B2* | 5/2003 | Katariya et al. | 709/214 |
| 6,845,394 B2 | 1/2005 | Ritche | |
| 7,346,923 B2 | 3/2008 | Atkins et al. | |
| 7,370,064 B2 | 5/2008 | Yousefi'zadeh | |
| 2002/0169852 A1* | 11/2002 | Schaeck | 709/218 |
| 2003/0167315 A1* | 9/2003 | Chowdhry et al. | 709/218 |
| 2004/0054749 A1 | 3/2004 | Doyle et al. | |
| 2005/0080768 A1* | 4/2005 | Zhang et al. | 707/3 |
| 2006/0004913 A1 | 1/2006 | Chong | |
| 2006/0031377 A1 | 2/2006 | Ng et al. | |
| 2006/0235935 A1* | 10/2006 | Ng | 709/208 |

OTHER PUBLICATIONS

Thomas Schaeck, Web Services for Remote Portals (WSRP) Whitepaper, Sep. 22, 2002.*
SmartComputing, Nov. 2002, [online], [retrieved on Nov. 7, 2008]. Retrieved from www.smartcomputing.com/editorial/article.asp?article=articles%2F2002%2Fs1311%2F59s11web%2F59s11web.asp, pp. 1-4.*
Bos, CSS Tutorial, May 29, 2004, retrieved from the internet <web.archive.org/web/*/http://www.w3.org/Style/Examples/011/firstcss.en.html>, pp. 1-12 as printed.*
Negus, C. et al., Linux Troubleshooting Bible, 2004, Wiley Publishing, Inc. pp. 40, 42.

* cited by examiner

*Primary Examiner* — Joseph Thomas
*Assistant Examiner* — Michael Chao
(74) *Attorney, Agent, or Firm* — Fliesler Meyer LLP (57) ABSTRACT

A producer can make available pages and books containing multiple applications. As used herein, the term "book" refers to a group of pages bound together by a navigational menu. The producer presents the pages and books to the consumer in a service description message. An administrator of the consumer can select the pages and books, thus generating proxy versions on the consumer. The proxy versions can then be presented on the consumer.

20 Claims, 5 Drawing Sheets

SYSTEM AND METHOD FOR DELIVERING GROUPED WEB SERVICE APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/169,557 entitled ENTITLEMENT DESIGNATION IN WEB SERVICES FOR REMOTE PORTLETS ENVIRONMENT, by Subbu Allamaraju et al., filed on Jun. 29, 2005;

U.S. patent application Ser. No. 11/172,253 entitled SYSTEM AND METHOD FOR A WEB SERVICE PORTLET REGISTRY, by Subbu Allamaraju, filed on Jun. 30, 2005;

U.S. patent application Ser. No. 11/170,884 entitled SYSTEM AND METHOD FOR PUBLISHING TO A WEB SERVICE PORTLET REGISTRY, by Subbu Allamaraju, filed on Jun. 30, 2005.

INCORPORATION BY REFERENCE

The present invention incorporates by reference in its entirety the Web Services for Remote Portlets standard version 1.0, by the OASIS Group.

FIELD OF THE INVENTION

The present invention relates broadly to the delivery of web portal content. The present invention relates more particularly to systems, methods, and computer readable media for providing applications for use on remote systems.

BACKGROUND OF THE INVENTION

Conventionally, web portals, which provide access to a variety of applications and content through a single location, have become an increasingly popular means for delivering applications and information. Whereas previously, web portals were used to deliver a relatively limited amount of functionality, they have become an increasingly popular means for delivering functional applications to local and global communities.

While many applications have been developed that can be presented on pages in a web portal, (these applications are sometimes referred to as portlets) an ongoing concern is that these applications often require a support framework that can be difficult to install and set up. Various mechanisms have been proposed to address this issue. The Web Services for Remote Portlets (WSRP) standard from the Oasis Group establishes a framework whereby applications can be presented on a page without the need for a support apparatus for the application on the server delivering the page.

However, conventional implementations of WSRP are limited in their ability to configure complex applications, and often require that applications be configured on a per-application basis. Such manual configuration approaches can become time consuming and difficult to implement. Additionally, conventional implementations do not include any easy mechanism for accessing static content, such as a web page on which an application might reside.

What is needed is an improved method of utilizing remote applications and their associated content.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

The present application discloses mechanisms and methods for providing applications for use on remote systems. The ability to provide applications for use on remote systems can enable a local version of a page that references a proxy application to be provided in place of an application. By providing a local version for the application, access to the application can be provided to an external machine reachable via at least one network. Accordingly, embodiments can provide access to pages and applications from a plurality of remote systems together as a web portal.

According to embodiment of the present invention, a consumer system accesses applications on a producer system. As used herein, the term "consumer" refers to a system that is configured to present applications that are located externally. A consumer typically offers one or more pages on an internal web portal that can be used to present remote applications. As used herein, the term "producer" refers to a system that offers one or more applications that can be presented on a consumer page while residing on the producer.

A producer can make available pages and books containing multiple applications. As used herein, the term "book" refers to a group of pages bound together by a navigational menu. The producer presents the pages and books to the consumer in a service description message. An administrator of the consumer can select the pages and books, thus generating proxy versions on the consumer. The proxy versions can then be presented on the consumer.

Figure 1:
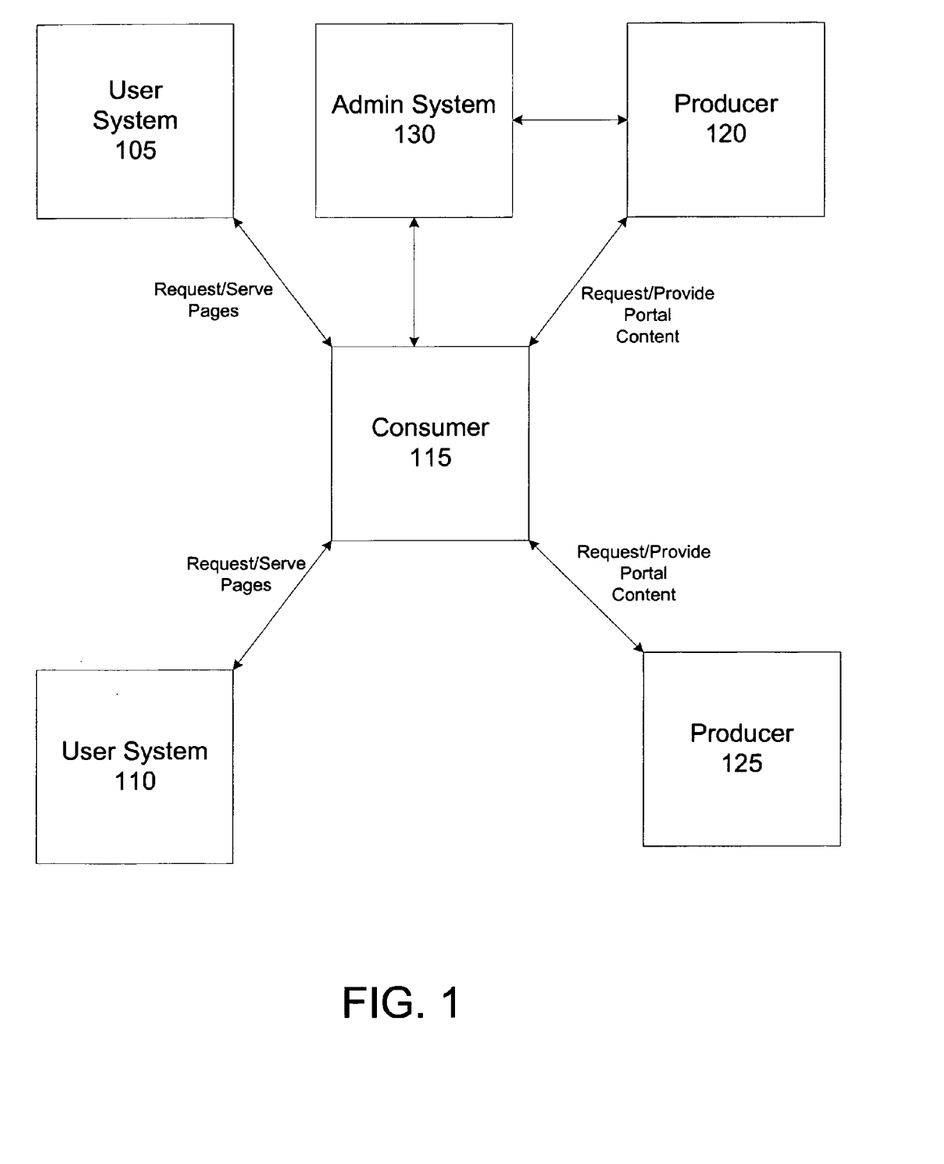
FIG. 1 is a block diagram illustrating one embodiment of an interaction between a producer, a consumer, and a user system.

FIG. 1 illustrates an overview of the interaction between a consumer system, user systems, and producer systems in an embodiment. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities. An admin system 130 interacts with the producer 120 and the consumer 115.

The consumer 115 is a network accessible system that serves web pages, content, and applications to other parties. The consumer 115 can serve its own content in addition to content stored on the producers 120, 125. The consumer 115 presents a web interface to the user systems 105, 110 that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

During a registration phase, the consumer 115 registers with a producer 120. In one embodiment, the producer 120 identifies each consumer 105, 110 with a unique handle that enables the producer 120 to identify what portlets are available to a particular consumer. In alternative embodiments, the consumer does not register with the producer 120. The producer can provide a service description to the consumer 115 that indicates properties of the producer 120 and lists the available portlets and pages that are stored on the producer 120. The producer 120 can also provide portlets that are grouped together in pages that store other content. Information about these pages is provided in the initial service description for the document. When a consumer attempts to integrate a page containing portlets, a copy of the page is generated on the consumer with one or more proxy portlets in place of the place of the portlets store on the page. These pages with proxy portlets can be made available or access by the user system 105.

During a description phase, the producer 120 also provides a Web Services Description Language (WSDL) file indicating data types and message protocols to be used for interacting with the producer 120. This process is described in greater detail with respect to FIG. 2.

When a user system 105 establishes contact with the consumer 115, the consumer 115 aggregates pages, and stores proxy portlets in the pages that access remote portlets on the producer 120. The user system 105 can send a page request to the consumer 115 for a page that includes remote portlets that utilize the producer. When such a request is received by the consumer 115 from the user system 105, the consumer 115 sends a request for the data that appears in the page to the producer 120. The producer 120 returns the data, which the consumer integrates into a single user interface and presents to the end user system 105.

The admin system 130 can be used to configure and extend the consumer 115. The admin system 130 is used to modify and configure content that is served the user systems 105 and 110. The admin system 130 can be used to configure the consumer to utilize portlets provided by the producer 120. In some embodiments, the admin system interacts with the producers through the consumer 115. In alternate embodiments, it receives information directly from the producer about its capacities.

Figure 2:
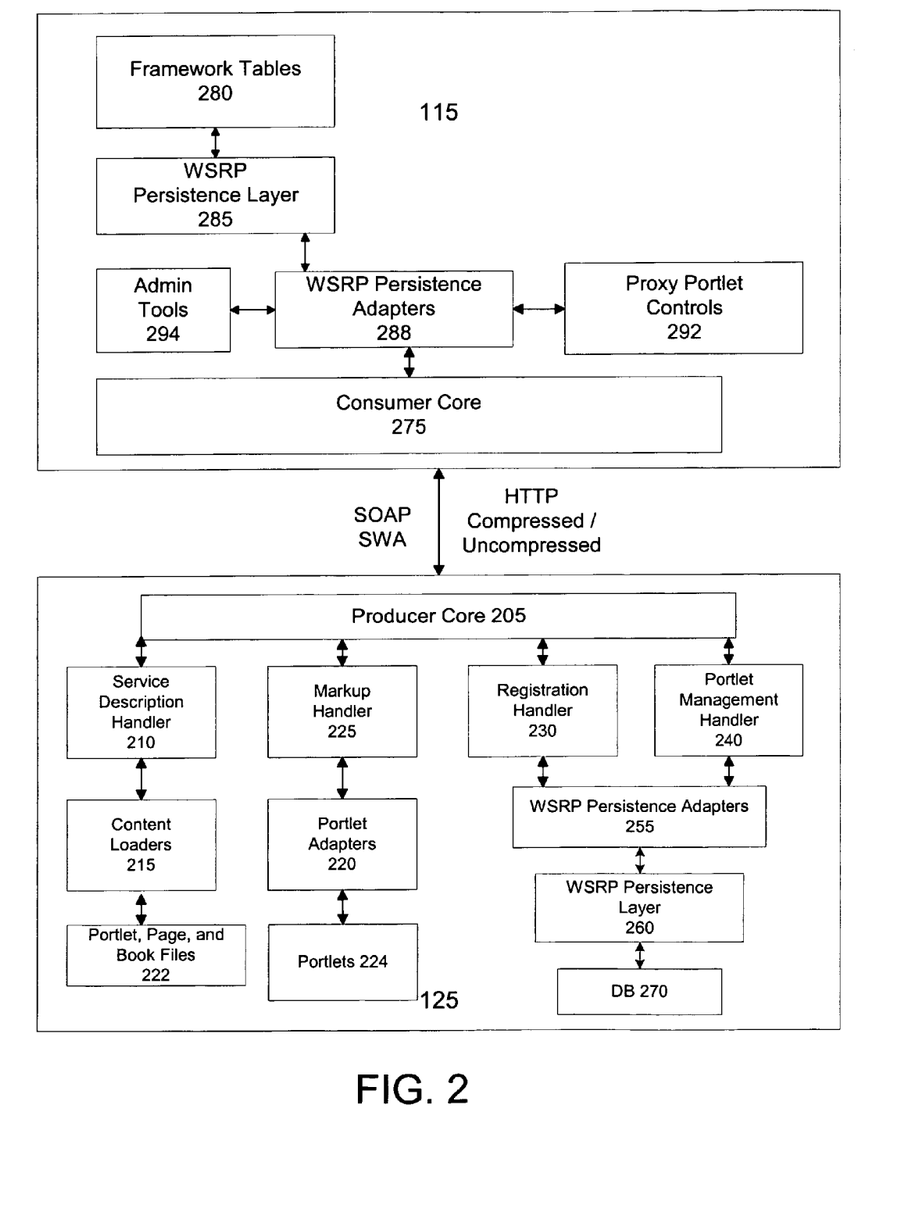
FIG. 2 is a block diagram illustrating another view of a consumer and a producer architecture in an embodiment.

FIG. 2 is a block diagram illustrating a more detailed view of a consumer 115 and a producer 125 in an embodiment of the present invention. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 265, one or more portlets 224, a server module 242, and a database (DB) 270.

The producer core 205 is an application such as a servlet that is configured to reside on the producer 125 and communicates with the consumer 115. The producer core 205 generates the WSDL files that indicate the parameters of communication between the producer 125 and the consumer 115 and transmits a file to the consumer 115 or otherwise provides the parameters to the consumer 115. These parameters can include data types and messaging protocols and can be preconfigured or user-selected.

The producer 205 additionally includes a service description handler 210. The service description handler 210 is responsible for providing a listing of portlets 224 that are available to consumers. The service description handler can provide the portlets in the form of individual portlets or in the form of pages containing portlets.

The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as Java Page Flow (JPF) portlets, Struts portlets, Java Specification Request (JSR) 168 base portlets, and Java portlets. Struts portlets are portlets that utilize the Struts framework layer from the Apache Software Foundation. JPF portlets are portlets that utilize Page Flows to separate interface content from navigation control and other functional logic. In some embodiments, the JPF portlets on the producer can support nested page flows. Nested page flows are page flows that can be utilized temporarily without discarding a currently executing page flow. While the above portlets types are used as examples throughout this application, it should be understood that any portlet type is supported.

The service description handler 210, through the producer core 205 returns to the consumer 115 a set of available portlets in the form of an array of PortletDefinition classes or some other format. The PortletDefinition classes include a portletHandle identifier that identifies the portlet and modes, states, MIME types, a title, and a description for each portlet. Other information can also be provided. The service description can also include one or more type extensions that provide information for generating proxy pages and books on a consumer system. These types include descriptors for pages and books and extensions for portlets located within books and pages. These types are described in greater detail with respect to FIGS. 3-5.

A registration handler 230 registers consumers with the producer 125 so that the consumers can access portlets on the producer 125. The registration process entails the consumer 115 providing certain determined identification information to the producer 125. In some embodiments, the producer does not register the consumer. The consumer registration information can be stored in the database 270 through the persistence adapters 255 and persistence layer 260.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240. In one embodiment, the WSRP persistence adapters 255 include separate adapters for the registration handler 230 and the portlet management handler 240. The persistence layer 260 manages access to the database 270 by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 260 receives the request in the form of an object modification request. The persistence layer 260 locates the various instances in the database 270 associated with the registration information and modifies them appropriately.

The markup handler 225 is responsible for processing markup requests (requests for the visual representation of the portlets within the page) for the portlets 224. When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR168, and Struts portlets. In some embodiments, a portlet adapter can comprise a Java Archive (JAR) file that is inserted into a producer to enable it to interact with remote consumers in a manner similar to how the portlet would interact with a local portal.

A server module 242 generates a user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touchscreen. In some embodiments, the server module 242 performs other portal display/management functions as well.

The consumer 115 includes a consumer core 275 that manages communication with the producer 125, one or more persistence adapters 288, administration tools 294, proxy portlet controls 292, a WSRP persistence layer 285, one or more pages 296 that reference the remote portlets 224 through included proxy portlets, a server module 276, and framework tables 280.

The consumer core 275 communicates with the producer core 205 using the Simple Object Access Protocol (SOAP) or another suitable protocol. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) and may use compression to reduce the size of transmitted data. The consumer core 275 receives a WSDL file from the producer 125 that it uses to configure its interaction with the producer 125. While in the present embodiment a file is used, in alternate embodiments, the configuration information can be provided in any one of a variety of different formats.

The framework tables 280 store information about the portlets available on the producer 125 (and other portlets) that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module 276 generates a user interface layer that enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touchscreen interface, or custom means. In some embodiments, the server module 276 performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer 285 receives the actions, locates the data corresponding to the objects on the framework tables 280 and retrieves and/or modifies the tables accordingly.

When a user system attempts to render a page 296 on the consumer that includes one of the remote portlets 224, the consumer 115 transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
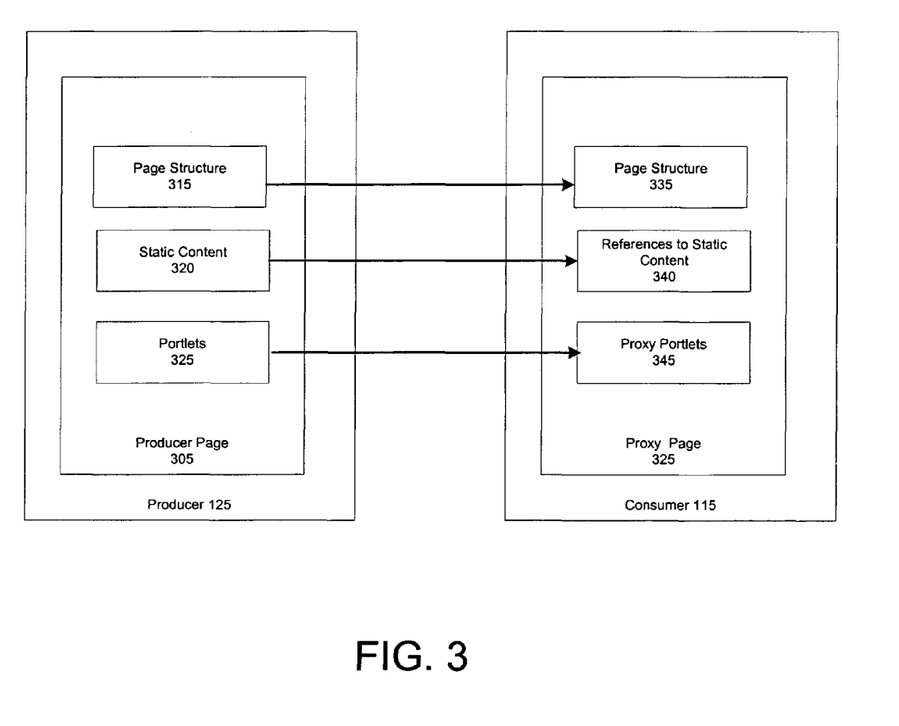
FIG. 3 is a block diagram illustrating a relationship between an original page and a proxy page in an embodiment.

FIG. 3 is a block diagram illustrating a relationship between an original page and a proxy page in an embodiment. When a consumer 115 accepts a page 305 that has been made remotely accessible on the producer 125, a proxy page 325 is generated on the consumer 115. While a single page is illustrated herein, it should be understood that multiple pages can be grouped together as books. The proxy page 325 can be made accessible to remote systems accessing the consumer 115. The page structure 315 of page 305 includes a layout and organization of the page, and the structure of menus, tables and other components that form the organization of the page 305. For books, the structure 315 can include a location of navigational menus for the book. The structure 335 can take the form of JSP code that is used to generate the structure or HTML code. In one embodiment, the structure 335 of the page is provided in the form of a control tree program that can be used to generate pages with the desired structure.

For the static content 320 of page 305, such as graphics and text, references 340 to the static content are generated for the proxy page 325. These references 340 can be in the form of HTML references that are directed towards the static content 320 on the producer page 305 or some other format.

For each of the portlets 325 that are on the producer page 305, a proxy portlet 345 is generated on the proxy page 325. The proxy portlets 345 are located on the section of the proxy page 325 corresponding to the producer page 305. When the proxy page 325 is viewed by a user system the static content 340 and proxy portlets 345 are presented within the copied structure, thus allowing the proxy page 325 to be presented as if it were local to the consumer 115.

Figure 4:
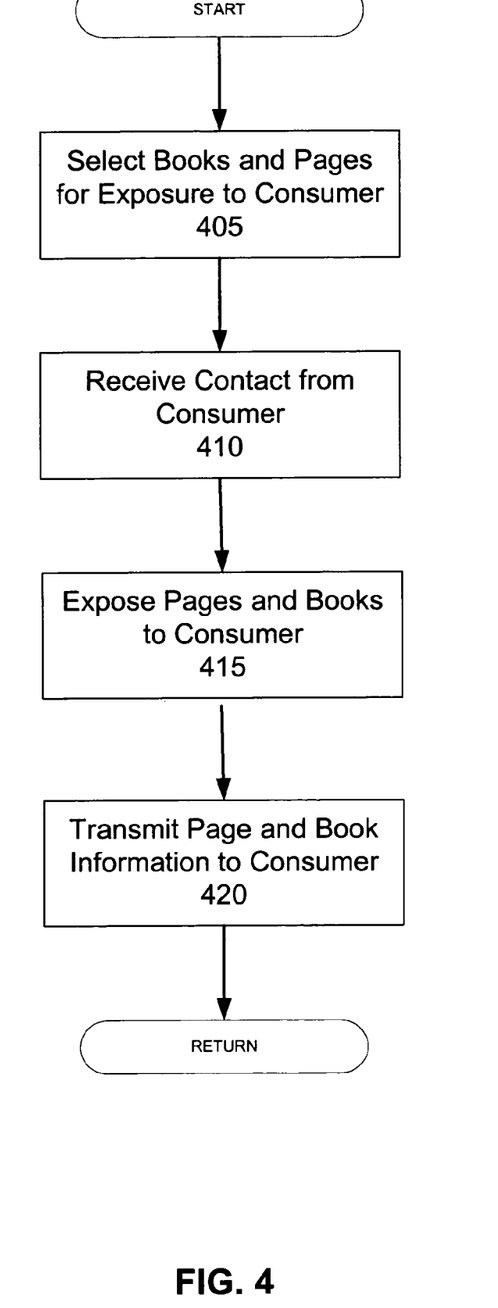
FIG. 4 is a flow chart illustrating an embodiment of a process for exposing pages to a remote consumer.

FIG. 4 is a flow chart illustrating an embodiment of a process for exposing pages to a remote consumer. This process can be performed by the producer system or by an external system for administering the producer. In block (405) the producer designates books and pages containing portlets that can be made accessible to remote consumers. In some embodiments, the books and pages are stored in the form of XML documents containing instructions for generating the pages. In these embodiments, the pages and books can be made available by designating the XML documents for the pages.

In block (410) contact is received from the consumer. During this processing, the consumer submits a service description request, which is a request for the portlets or other content that are available to be used remotely. In one embodiment, this request is transmitted in the form of an XML document.

In block (415) the producer exposes the pages and books to the consumer. In one embodiment this information is provided in the form of a Service Description XML document that is transmitted to the consumer. In some embodiments, the XML document includes one or more types that define pages and books that can be made accessible. The following code can be used to provide information about a book that can be made remotely accessible:

```
<xs:complexType name="BookDescriptionType">
  <xs:complexContent>
    <xs:extension base="wlp-types:PlaceableType">
      <xs:sequence>
        <xs:element name="name" type="types:LocalizedString"/>
        <xs:element name="description" type="types:LocalizedString" minOccurs="0"/>
        <xs:element name="title" type="types:LocalizedString" minOccurs="0"/>
        <xs:element name="menu" type="xs:string"/>
        <xs:choice minOccurs="0" maxOccurs="unbounded">
          <xs:element ref="wlp-types:PageDescription"/>
          <xs:element ref="wlp-types:PortletRef"/>
        </xs:choice>
      </xs:sequence>
    </xs:extension>
  </xs:complexContent>
</xs:complexType>
```

The code includes a name, description, and identifier for the book and whether the book is public. The book description in includes multiple Page Description and Portlet Ref descriptors that respectively provide information for pages in the book and portlets within the pages.

The following code can be provided to a consumer to define an accessible remote page. It can be part of a book descriptor or stand alone:

```
<xs:complexType name="PageDescriptionType">
  <xs:complexContent>
    <xs:extension base="wlp-types:PlaceableType">
      <xs:sequence>
        <xs:element name="name" type="types:LocalizedString"/>
        <xs:element name="description" type="types:LocalizedString" minOccurs="0"/>
        <xs:element name="title" type="types:LocalizedString" minOccurs="0"/>
        <xs:element name="layout" type="xs:string"/>
        <xs:element name="placeable" type="wlp-types:PlaceableType" minOccurs="0" maxOccurs="unbounded"/>
      </xs:sequence>
      <xs:attribute name="isPublic" type="xs:boolean"/>
    </xs:extension>
  </xs:complexContent>
</xs:complexType>
```

The code includes a name, description, and identifier for the page and whether the page is public. The layout value refers to a URI for the layout so that it can be copied to the page.

The service description also includes one or more descriptors for portlets that appear within remotely accessible pages. Enclosed is one example of a descriptor for such a portlet:

```
<xs:complexType name="PortletRefType">
    <xs:complexContent>
        <xs:extension base="wlp-types:PlaceableType">
            <xs:sequence>
                <xs:element name="portletHandle" type="xs:string"/>
            </xs:sequence>
        </xs:extension>
    </xs:complexContent>
</xs:complexType>
```

The information above includes a reference to a handle for the portlet. This information would be stored within the descriptor for the page storing the portlet. In block (420) the layout information and any other information that is stored on the consumer is transmitted to the consumer system.

Figure 5:
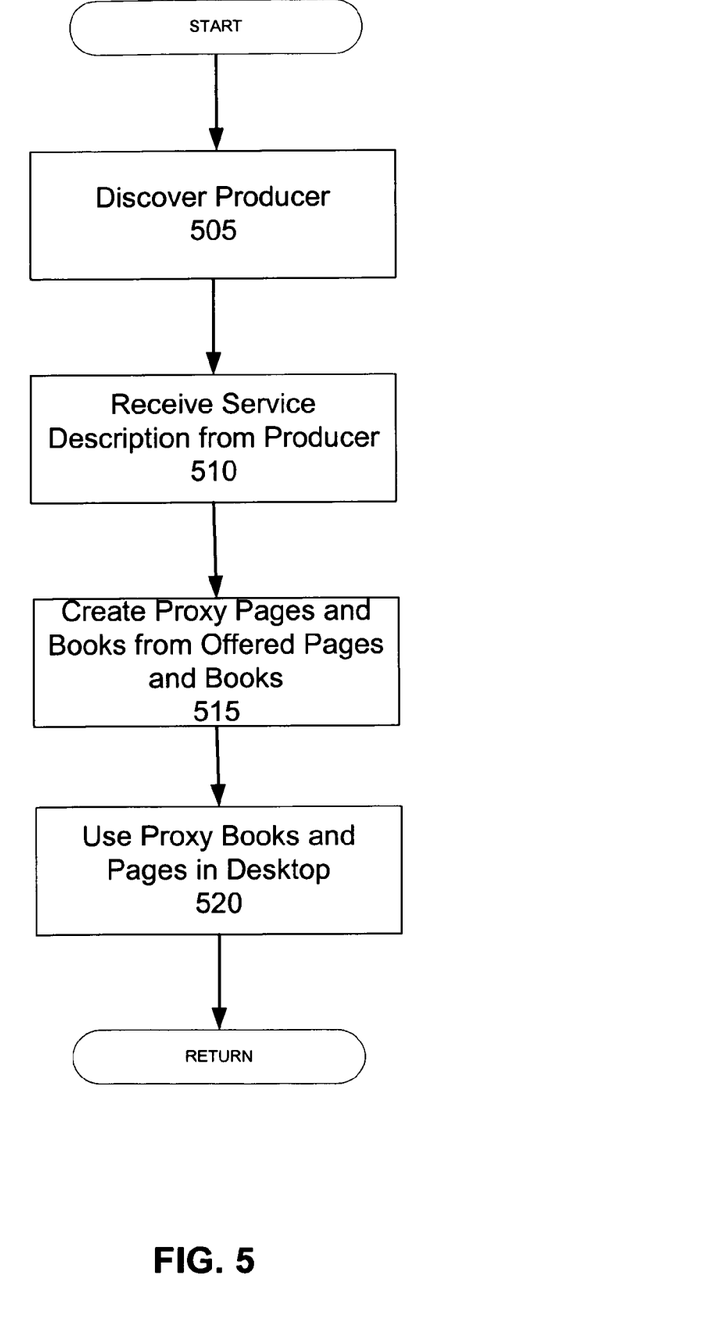
FIG. 5 a flow chart illustrating an embodiment of a process for utilizing remote pages and books.

FIG. 5 a flow chart illustrating a process for utilizing remote pages and books. In block (505) the producer is discovered. This processing can be performed through the consumer system or through an external administrative system. In one embodiment, the consumer utilizes a web service registry listing available producer systems. In block (510) the service description is received from the producer. The service description can include listings of portlets that are independent of particular pages, pages containing portlets and pages and books with portlets stored therein. In one embodiment, the service description utilizes the types described with respect to FIG. 4.

In block (515) proxy books and proxy pages are created. In one embodiment creating proxy books and proxy pages entails generating XML instructions for creating the proxy pages and books. This entails generating XML instructions for generating each of the pages in the books. These instructions include references to the remote portlets that will be utilized in the remote pages and books in the locations where instructions for local portlets might be stored. For example, the XML code for a page might include a layout and a description of several areas of the page. Whereas a typical page would include portlet code near the section of the page layout where the portlet would be stored, the proxy page would include a proxy portlet or a reference for utilizing the remote portlet on the producer system. This process is performed for all the proxy pages.

In block (520) the proxy books and pages are stored in the desktop. This processing entails modifying one or more XML documents for the portal to store the XML instructions developed in block (515). The proxy pages and books can now be accessed through the consumer as if they were stored locally.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for utilizing applications stored on a remote system, the method comprising:

determining, by a local system using a web service registry, a remote system which includes content capable of being utilized remotely by the local system, including a book comprising a plurality of pages that share a common navigation interface, wherein each page includes static content, a page structure defining layout and organization of that page including a location of navigation menus for the book, and a plurality of applications capable of being utilized remotely by the local system;

sending a service description request to the remote system requesting the content available at the remote system and capable of being utilized remotely by the local system;

receiving, in response to the service description request, a service description document indicating the content available at the remote system and capable of being utilized remotely by the local system, wherein the service description document includes information for generating a local version of the book;

generating, based on the service description document, the local version of the book, including
copying the page structure, for each page in the book, to the local version of the book, to define layout and organization of the local version of each page in the book,
generating references to the static content, for each page in the book, for the local version of the book, and creating a plurality of proxy applications for the local version of the book, each proxy application corresponding to a different application in the book, wherein each proxy application is a Web Services for Remote Portlets (WSRP) proxy portlet, wherein each application at the remote system is capable of being utilized remotely by the local system using the corresponding proxy application when the local version of the book is accessed via a web portal on the local system; and displaying, through a web interface, the local version of the book that is organized according to each copy of the page structure and includes the static content of each page and each proxy application, so that each application at the remote system is remotely accessible by the local system through the proxy applications.

2. The method of claim 1, wherein the step of determining, by a local system using a web service registry, a remote system which includes content capable of being utilized remotely by the local system further comprises:

determining at least one page comprising at least one portlet on the remote system.

3. The method of claim 1, wherein the step of generating, based on the service description document, the local version of the book further comprises:

creating a local version of each page in the book that references at least one proxy application.

4. The method of claim 3, wherein the step of creating a local version of each page in the book comprises:

organizing each page into a file for the book.

5. The method of claim 3, wherein the step of creating a local version of each page in the book comprises:

organizing each page into a file for a page.

6. The method of claim 1, wherein the remote system is a Web Services for Remote Portlets (WSRP) producer.

7. The method of claim 1, further comprising:

providing the local version of each page in the book that references at least one proxy application in place of at least one application, associated with the at least one proxy application, capable of being utilized remotely for access by an external machine reachable via at least one network.

8. The method of claim 1, further comprising:

providing access to at least one page and at least one application from a plurality of remote systems together as a web portal.

9. The method of claim 1 wherein the remote system utilizes application loaders to load the plurality of applications for use by the local system, and wherein the remote system includes different types of application loaders for different types of applications.

10. A non-transitory machine readable storage medium comprising instructions that when executed cause a system to:

determine, by a local system using a web service registry, a remote system which includes content capable of being utilized remotely by the local system, including a book comprising a plurality of pages that share a common navigation interface, wherein each page includes static content, a page structure defining layout and organization of that page including a location of navigation menus for the book, and a plurality of applications capable of being utilized remotely by the local system;

send a service description request to the remote system requesting the content available at the remote system and capable of being utilized remotely by the local system;

receive, in response to the service description request, a service description document indicating the content available at the remote system and capable of being utilized remotely by the local system, wherein the service description document includes information for generating a local version of the book;

generate, based on the service description document, the local version of the book, including copying the page structure, for each page in the book, to the local version of the book, to define layout and organization of the local version of each page in the book, generating references to the static content, for each page in the book, for the local version of the book, and creating a plurality of proxy applications for the local version of the book, each corresponding to a different application in the book, wherein each proxy application is a Web Services for Remote Portlets (WSRP) proxy portlet, wherein each application at the remote system is capable of being utilized remotely by the local system using the corresponding proxy application when the local version of the book is accessed via a web portal on the local system; and displaying, through a web interface, the local version of the book that is organized according to each copy of the page structure and includes the static content of each page and each proxy application, so that each application at the remote system is remotely accessible by the local system through the proxy applications.

11. The non-transitory machine readable storage medium of claim 10, wherein the instructions for causing the system to determine, by a local system using a web service registry, a remote system which includes content capable of being utilized remotely by the local system include instructions for causing the system to:

determine at least one page on the remote system, the at least one page comprising at least one portlet.

12. The non-transitory machine readable storage medium of claim 10, wherein the instructions for causing the system to generate, based on the service description document, the local version of the book include instructions for causing the system to:

create a local version of each page in the book that references at least one proxy application.

13. The non-transitory machine readable storage medium of claim 12, wherein the instructions for causing the system to create a local version of each page in the book include instructions for causing the system to:

organize each page into a file for the book.

14. The non-transitory machine readable storage medium of claim 12, wherein the instructions for causing the system to create a local version of each page in the book include instructions for causing the system to:

organize the each page into a file for a page.

15. The non-transitory machine readable storage medium of claim 10, wherein the remote system is a Web Services for Remote Portlets (WSRP) producer.

16. The non-transitory machine readable storage medium of claim 10, further comprising instructions for causing the system to:

provide the local version of each page in the book that references at least one proxy application in place of at least one application, associated with the at least one proxy application, capable of being utilized remotely for access by an external machine reachable via at least one network.

17. The non-transitory machine readable storage medium of claim 10, further comprises instructions for causing the system to:
provide access to at least one page and at least one application from a plurality of remote systems together as a web portal.

18. The non-transitory machine readable storage medium of claim 10 wherein the remote system utilizes application loaders to load the plurality of applications for use by the local system, and wherein the remote system includes different types of application loaders for different types of applications.

19. A system for utilizing applications stored on a remote system, the system comprising:
a computer including a computer readable medium and processor operating thereon;
a consumer component, executing on the computer, wherein the consumer component is configured to
determine, using a web service registry, a remote system which includes content capable of being utilized remotely by the consumer component, including a book comprising a plurality of pages that share a common navigation interface, wherein each page includes static content, a page structure defining layout and organization of that page including a location of navigation menus for the book, and a plurality of applications capable of being utilized remotely by the consumer component,
send a service description request to the remote system requesting the content available at the remote system and capable of being utilized remotely by the local system,
displaying, through a web interface, a local version of the book; and
an admin component configured to
in response to the service description request, receive a service description document indicating the content available at the remote system and capable of being utilized remotely by the consumer component, wherein the service description document includes information for generating a local version of the book, and
generate, based on the service description document, the local version of the book on the consumer component, including
copying the page structure, for each page in the book, to the local version of the page, to define layout and organization of the local version of each page in the book,
generating references to the static content, for each page in the book, for the local version of the book;
creating a plurality of proxy applications, for the local version of the book, each corresponding to a different application in the book, wherein each application at the remote system is capable of being utilized remotely by the consumer component using the corresponding proxy application when the local version of the book is accessed via a web portal on the consumer component, and wherein each proxy application is a Web Services for Remote Portlets (WSRP) proxy portlet, and
wherein the local version of the book is organized according to each copy of the page structure and includes the static content of each page and each proxy application, so that the plurality of applications at the remote system are remotely accessible by the consumer component through the proxy applications.

20. A method for utilizing applications stored on a producer system, the method comprising:
determining, by a consumer system using a web service directory, an available producer system;
registering the consumer system with the producer system;
sending a service description request from the consumer system to the producer system;
receiving at the consumer system from the producer system a service description that includes a list of available content stored on the producer system that is remotely accessible by the consumer system wherein the available content includes a book comprising a plurality of pages that share a common navigation interface, wherein the book includes a location of navigation menus for the book, and wherein each page includes one or more portlets;
receiving at the consumer system from the producer system a Web Services Description Language (WSDL) file indicating data types and message protocols to be used by the consumer system to interact with the producer system;
generating, based on the WSDL file, a proxy book at the consumer system corresponding to the book, wherein the proxy book includes
a copy of a structure and layout of the pages in the book,
a reference to at least one static content in the book, and
at least one Web Services for Remote Portlets (WSRP) proxy portlet corresponding to the at least one portlet; and
displaying, through a web interface, a web portal at the consumer system that includes the proxy book.

* * * * *